United States Patent [19]

Bierhoff et al.

[11] Patent Number: 5,103,439

[45] Date of Patent: Apr. 7, 1992

[54] BEAM FOCUS CONTROL SYSTEM FOR OPTICAL RECORD CARRIER SCANNING APPARATUS

[75] Inventors: Martinus P. M. Bierhoff; Job F. P. van Mil, both of Eindhoven, Netherlands

[73] Assignee: U.S. Philips Corporation, New York, N.Y.

[21] Appl. No.: 352,445

[22] Filed: May 16, 1989

[30] Foreign Application Priority Data

Dec. 8, 1988 [NL] Netherlands ......................... 8803012

[51] Int. Cl.$^5$ ............................................. G11B 7/00
[52] U.S. Cl. ........................... 369/44.270; 369/44.29; 369/44.35
[58] Field of Search ............... 369/44.25, 44.28, 44.29, 369/44.35, 44.36, 32, 44.27; 250/204, 201.5, 201.9; 358/342

[56] References Cited

U.S. PATENT DOCUMENTS

| | | | |
|---|---|---|---|
| 4,128,847 | 12/1978 | Roullet et al. | |
| 4,561,080 | 12/1985 | Yamazaki | 369/44.29 |
| 4,627,041 | 12/1986 | Uemara | 369/44.25 |
| 4,636,625 | 1/1987 | Emoto et al. | 250/204 |
| 4,669,074 | 5/1987 | Hsieh et al. | 369/44.29 |
| 4,677,605 | 6/1987 | Abed | 369/44.29 |
| 4,683,561 | 7/1987 | Bierhoff et al. | 369/44.25 |

*Primary Examiner*—Roy N. Envall, Jr.
*Assistant Examiner*—Thang V. Tran
*Attorney, Agent, or Firm*—Leroy Eason

[57] ABSTRACT

A focus control system for optical record carrier scanning apparatus includes a mechanical actuator (13) for moving the focus of the scanning beam relative to a recording layer of the record carrier, a focus-error detection circuit (15, 16, 17) for generating a focus-error signal (FE), and a control circuit (26) for generating a first control signal (AS') for the actuator (13) which is proportional to the focus-error signal (FE). In order to ensure that the actuator is within its generating range when it locks-in to the focus-error signal, the system also includes a lock-in circuit (20) having a signal generator (21) and an integrator (23) for generating an additional control signal (AS') for the actuator (13) prior to lock-in. A lock-in detection circuit (25) generates a lock-in signal (IN FOCUS) when the focus error is in the operation range, which causes a switch (22) to change-over the input to integrator (23) to the focus-error signal (FE) and also enables the control circuit (26) to provide the first control signal (AS'). Thus, after lock-in the integrator (23) and the control circuit (26) constitute a controller for controlling actuator (13) in accordance with both the focus-error signal and the integral thereof. This compensates for low-frequency disturbances and renders the control system more immune to variations in the parameters affecting correct beam focus position.

9 Claims, 3 Drawing Sheets

BEAM FOCUS CONTROL SYSTEM FOR OPTICAL RECORD CARRIER SCANNING APPARATUS

BACKGROUND OF THE INVENTION

1. Field of the Invention

The invention relates to an optical scanning device for scanning a recording layer of a record carrier by means of a scanning beam, which scanning device comprises a focus-control system for bringing the scanning beam into focus substantially coincident with the plane of the recording layer. The focus control system comprises an actuator for moving the focus relative to the plane of the recording layer; a focus-error detector for generating a focus-error signal which, within a specific operating range of the actuator, is indicative of the distance between the focus and the plane of the record carrier; and a control circuit for deriving, depending on the focus-error signal, a first control signal for the actuator. The scanning device further comprises a signal generator for generating a time-variable additional control signal for the actuator in a time interval in which the focus-control system is inoperative, the signal generator comprising an auxiliary circuit for generating a first input signal for integrating means and a circuit for deriving the additional control signal from the output signal produced by the integrating means. The scanning device also comprises means for rendering the focus-control system operative in response to a lock-in detection signal which indicates that the focus actuator has reached its operating range.

2. Description of the Related Art

The invention further relates to an integrated circuit for use in the focus-control system.

A scanning device of the aforesaid type is disclosed in U.S. Pat. No. 4,128,847. In the scanning device described therein the scanning beam is focused on the record carrier via a focusing objective which is movable along its optical axis. When the focus-control system is operative the focusing objective is driven by the actuator, the actuator being controlled in dependence upon the focus-error signal in such a way that the radiation beam remains in focus on the recording layer of the record carrier.

Before the focus-control system is rendered operative an auxiliary circuit generates a periodic rectangular signal, which is converted into a triangular control signal for the actuator by means of an integrator. The focusing objective is then moved towards or away from the record carrier depending on the direction of the edges of the triangular signal.

When the operating range of the focus-control system is reached the integrating means are set to a hold condition, in which the existing integration value is retained. Moreover, the focus-control system is then actuated by closing the control loop so thereafter the scanning beam is maintained in focus on the record carrier. This method of rendering the focus-contro signal operative is referred to as locking-in of the focus control. After locking-in of the focus-control system the operating point of the known scanning device is, in fact, dictated by the integration value then being held.

This means that the instant of locking-in should be defined accurately. Also, for correct control the operating point of the control system should be situated in the middle of the control range. This which enable focus errors in both directions to be compensated for to a maximum extent.

Another drawback of the known device is that the integration value at the output of the integrator must be maintained constant for a long time, namely until the focus-control system is restarted after the record carrier has been changed. This means that the control point is not adapted to changes in those parameters of the playing device or the record carrier which cause the focal distance between the optical head and the record carrier to change. Moreover, in order to preclude an undesirable variation of the control point a substantially drift-free integrator must be used. In practice, this means that in fact only digital integrators are suitable.

SUMMARY OF THE INVENTION

It is an object of the invention to provide a device as defined in the opening paragraph, in which the requirements imposed on the integrator and the detection of the lock-in instant of the focus-control system can be less stringent and in which the control process is adapted to said parameter changes. According to the invention this object is achieved by means of a scanning device which is characterized in that the scanning device comprises means which are responsive to the lock-in detection signal, instead of to the first input signal, to apply the focus-error signal to the integrating means.

In the scanning device in accordance with the invention the control circuit and the integrating means together constitute a controller with an integrating or I-action, so that low-frequency disturbances are almost wholly compensated for, as a result of which the control system is more immune to parameter variations.

The control point of a control system comprising a controller with I action is always adapted automatically. This automatic adaptation also means that the instant at which the focus control is rendered operative has become considerably less critical.

The scanning device in accordance with the invention further has the advantage that the same integrating means are used both for generating the actuator control signal during locking-in and for obtaining the I-action of the controller. This is of advantage in particular if the focus control circuit is constructed as an integrated analog circuit. The customary integrating means, normally a capacitor, are difficult to integrate. In practice, this means that an external capacitor must be connected to the integrated circuit via a connection terminal. Since the provision of such terminals on integrated circuits is comparatively expensive it is desirable that the number of connection terminals should be minimised. The double use of the integrating means is therefore very attractive.

An embodiment of the scanning device which is attractive because of its simplicity is characterized in that the output of the integrating means is coupled to an input of an auxiliary circuit in order to form a feedback oscillator for generating the control signal.

Another embodiment of the scanning device is characterized in that it comprises a detection circuit for deriving the lock-in range detection signal from the focus-error signal.

This embodiment advantageously utilises the fact that the focus-error signal itself indicates whether the operating range of the actuator is reached. In contradistinction to deriving the lock-in detection signal from the information signal being read, as is known from the above U.S. patent, the method of deriving it in the last-mentioned embodiment has the advantage that it can also be used in conjunction with blank record carriers such as, for example, optical "write-once" discs.

The customary optical record carriers comprise a transparent substrate on which the recording layer is deposited. The recording layer is scanned via the transparent substrate. A part of the scanning beam is then reflected by the outer surface of the substrate (foreground reflection). As a result of this foreground reflection a focus-error signal is also generated if the scanning beam is focused on the outer surface of the substrate. During locking-in of the focus-control system it is therefore necessary to prevent said control system from locking-in to the outer surface of the substrate.

This can be achieved by means of an embodiment of the scanning device which is characterized in that the auxiliary circuit comprises means for generating a direction signal, which indicates the direction in which the focus is moved, the detection circuit being adapted to derive the lock-in detection signal from the strength of the focus-error signal and from the direction indicated by the direction signal, in such a way that the lock-in detection signal is generated if the focus-error signal intersects a specific reference level for a predetermined direction of movement of the focus.

By enabling the focus-control system to be switched on only if the focus actuator is moved in a predetermined direction, locking-in becomes possible only if the focus of the scanning beam is moved in a direction in which the instant at which the focus passes the record carrier plane precedes the instant at which it passes the outer surface of the substrate, so that the likelihood that the focus-control system locking in to said outer surface is substantially excluded.

Another embodiment of the scanning device is characterized in that the control circuit comprises a differentiating element for differentiating the focus-error signal, the control circuit being adapted to derive the first control signal for the actuator from the differentiated focus-error signal, the means for rendering the focus-control system operative comprising switching means which are responsive to the detection signal to apply the first control signal to the actuator.

The use of a control circuit with a differentiating action provides a more stable control. Another advantage of this embodiment is that the focus-error signal is also applied to the differentiating element during locking-in, so that the differentiating element cannot cause an undesired transient effect when the control system is rendered operative.

A further embodiment of the scanning device is characterized in that the control circuit comprises means for applying the differentiated focus-error signal to the actuator if said operating range is traversed in said predetermined direction while the focus-control system is inoperative.

By applying the differentiated focus-error signal to the actuator while the operating range is traversed in said predetermined direction it is achieved that the speed with which the focus is moved during passage of the operating range is reduced. This means that by the time the control system is rendered operative (the instant of locking-in) the speed with which the focus is moved has already been decreased substantially relative to the speed with which the operating range is reached. This enables the operating range to be approached with a high speed without the risk of overshooting this range as a result of this high speed. Indeed, as soon as the operating range is entered the speed with which the focus is moved is reduced at once as a result of the feedback of the differentiated focus-error signal to the actuator.

BRIEF DESCRIPTION OF THE DRAWINGS

Embodiments of the scanning device in accordance with the invention will now be described in more detail, by way of example, with reference to FIGS. 1 to 4, in which.

DESCRIPTION OF THE PREFERRED EMBODIMENT

Figure 1:
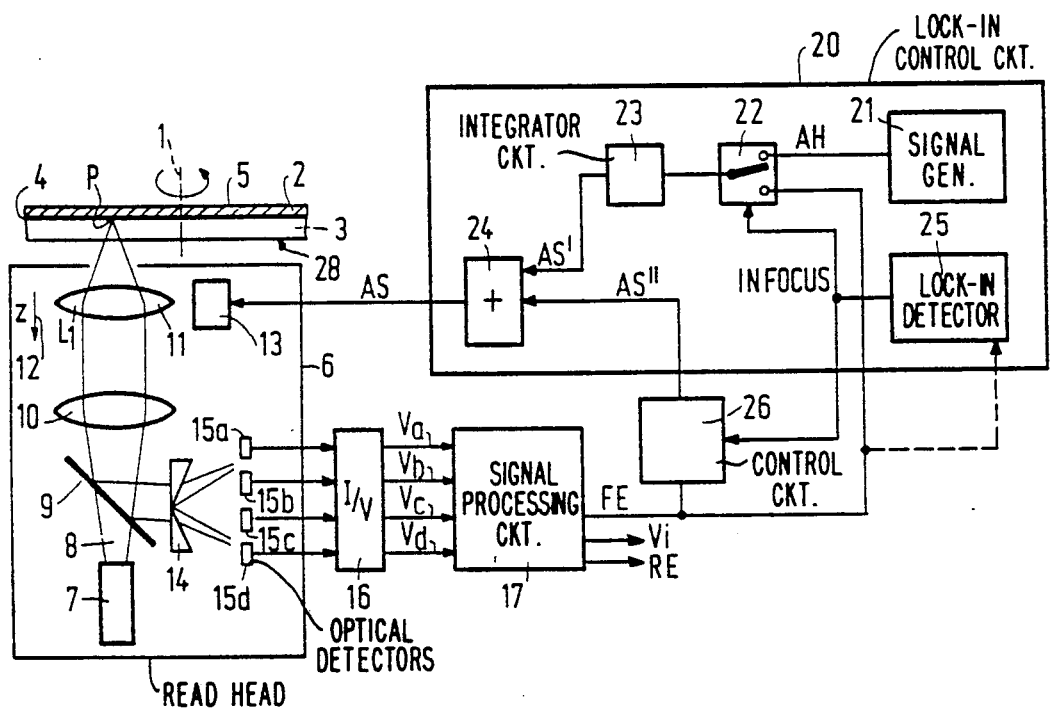
FIGS. 1 and 3 show two different embodiments of the scanning device in accordance with the invention.

FIG. 1 shows an embodiment of a scanning device in accordance with the invention for optically reading information from a record carrier 2, for example a "Compact Disc", which rotates about an axis 1.

The record carrier 2 comprises a transparent substrate 3 provided with a recording layer 4. The recording layer 4 is covered with a protective coating 5. The recording layer 4 has information tracks (not shown) having a structure which is representative of the recorded information. The information recorded in the information tracks can be read by scanning the information tracks with a radiation beam and detecting the beam modulation produced by the track structure. For this purpose the scanning device comprises an optical read head 6 of a customary type. The read head 6 comprises a laser 7 which generates a radiation beam 8, which is aimed at the recording layer 4 via a semitransparent mirror 9 and the objectives 10 and 11. The radiation beam is then concentrated to very small dimensions at the focus P. In order to ensure that the focus P coincides with the plane of the recording layer 4 the objective 11 is movable in the direction indicated by an arrow 12 by means of a diagrammatically shown mechanical actuator 13 of a customary type, which moves the objective 11 relative to the read head 6 over a distance dictated by an actuator control signal AS.

In order to determine the focus error the beam reflected from the recording layer 4 is projected onto an array of four optical detectors 15a, 15b, 15c and 15d via the semitransparent mirror 9, and a beam splitter, for example in the form of a roof prism 14. The detection currents supplied by the optical detectors 15 are converted into four signal voltages Va, Vb, Vc and Vd by means of a current-voltage converter 16. A signal processing circuit 17 derives a focus-error signal FE from these signal voltages. Moreover, the signal-processing circuit derives a tracking error signal RE and a read signal, Vi, which is representative of the information being read, from the signal voltages.

Figure 2:
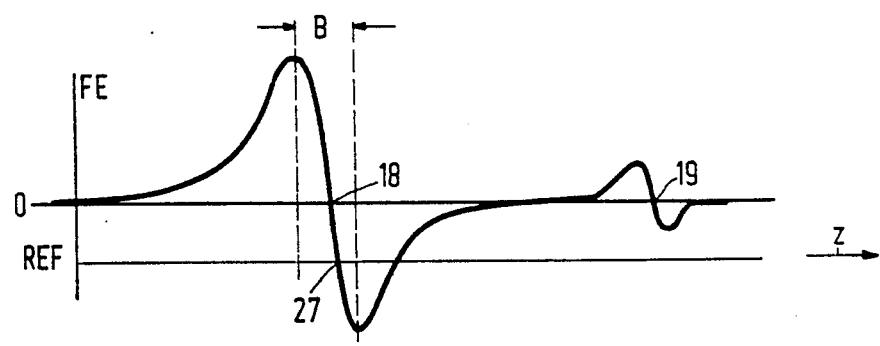
FIG. 2 shows the focus-error signal as a function of the position of the focus objective.

FIG. 2 shows the focus-error signal FE as a function of the distance z of the objective to the recording layer 4. The focus-error signal FE is substantially proportional to the focus error within an operating range B. The reference numeral 18 indicates the distance at which the focus P coincides with the plane of the recording layer 4. The reference numeral 19 denotes the distance at which the focus P coincides with the outer surface 28 of the substrate 3. At either side of the distance 19 the focus-error signal FE has a non-zero value. This is caused by the fact that the outer surface 28 of the substrate 3 partly reflects the scanning beam. This results in an undesirable focus-error signal being generated in the case that the focus P is situated in the proximity of the outer surface of the substrate.

The scanning device further comprises a lock-in circuit 20. The lock-in circuit 20 comprises an auxiliary circuit in the form of a rectangular-wave generator 21 for generating a periodic rectangular signal AH which is applied to an integrator 23 via an electronic switch 22. The integrator 23 converst the rectangular signal into a triangular signal, which is applied to the actuator 13 via a summing circuit 24. The actuator is responsive to the triangular signal to alternately increase and reduce the distance between the objective and the recording layer 4. The rectangular-wave generator 21, the integrator 23 and the actuator 13 are dimensioned in such a way that during the reciprocating motion of the objective the focus P each time passes through the plane of the recording layer 4. A detection circuit 25 generates a lock-in detection signal INFOCUS, which indicates that the position of the objective 11 is within the operating range B. The detection circuit may comprise, for example, the detection circuit described in U.S. Pat. No. 4,128,847, which derives such a detection signal from the amplitude of the high-frequency information signal being read. However, other detection circuits may also be used. An example of a detection circuit in which the detection signal is derived from the focus-error signal will be described hereinafter with reference to FIG. 3. The detection signal INFOCUS is applied as a control signal to the switch 22 and to a control circuit 26. The control circuit 26 is rendered operative in response to the detection signal INFOCUS. The control circuit 26 generates an output signal AS which comprises at least a component which is proportional to the focus-error signal FE. In response to the detection signal INFOCUS the switch 22 is controlled in such a way that instead of the signal AH the focus-error signal FE is applied to the integrator 23. The control circuit 26 and the integrator 23 together form a controller having at least a proportional as well as an integrating action so as to control the actuator 13 in such a way that the focus-error signal FE is maintained substantially at zero. Since at the instant at which the control circuit 26 is rendered operative the actuator 13 is situated in the operating range B, the focus P will be moved substantially to the plane of the recording layer. This means that the focus-control system has then locked in to the recording layer 4.

By the use of a controller with an integrating action low-frequency focus errors are fully compensated for. This means that if the distance between the read head 2 and the recordinglayer 2 changes during reading this is fully compensated for by a change of the output signal of the integrator 23. Moreover, the exact position of the objective 11 in the lock-in range at the instant at which the focus-control system is rendered operative is not critical. Indeed, owing to the integrating action the objective is automatically moved towards the correct focus position indicated by the reference numeral 18 in FIG. 2.

Figure 3:
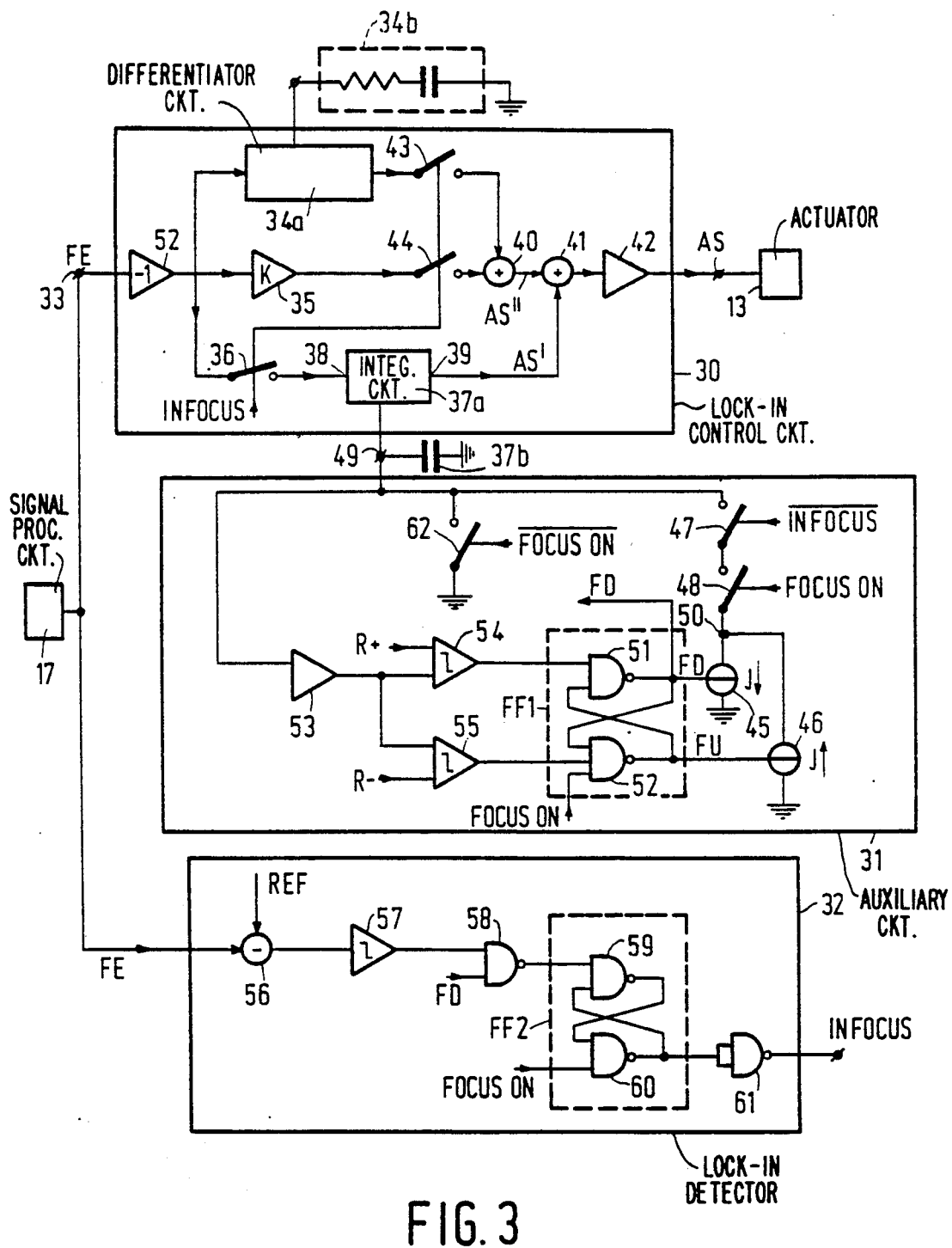

FIG. 3 shows a second embodiment of the scanning device in accordance with the invention. This embodiment comprises a PID controller in the form of a control circuit 30, an auxiliary circuit 31 and a lock-in detection circuit 32. The circuits 30, 31 and 32 form part of one integrated circuit.

In the control circuit 30 the focus-error signal FE is applied to an inverter circuit 52 for inverting the focus-error signal FE. The inverted focus-error signal FE is applied to a differentiator comprising a circuit 34a included in the integrated circuit and an RC circuit 34b, which defines the time constant of the differentiator and does not form part of the integrated circuit. The differentiator circuit 34a may comprise a circuit which supplies a voltage proportional to the inverted focus-error signal FE to the RC-circuit 34b and a circuit which supplies a signal proportional to the current in the RC circuit 34b, and therefore to the derivative of the signal FE, to the output of the differentiator.

The inverted focus-error signal FE is further applied to an amplifier 35 having a constant gain factor K. Finally, the inverted focus-error signal FE is applied to an input 38 of an integrator 37a via an electronic switch 36, which integrator comprises circuit forms part of the integrated circuit and a capacitor 37b, which defines the integration constant of the integrator. The capacitor 37b is not included in the integrated circuit but is connected to the circuit 37a via a terminal 49. The circuit 37a may comprise, for example, a controlled current source which charges the capacitor 37b with a current which is proportional to the signal strength of the signal applied to the input 38, and an amplifier circuit which on an output 39 generates a voltage signal AS' which is proportional to the voltage across the capacitor 37b and therefore to the integral of the signal at terminal 38. A summing device 40 combines the output signals of the differentiator 34a and the amplifier 35 to form a signal AS", an electronic switch 43 being arranged in the signal path between the differentiator 34a and the summing device 40 and an electronic switch 44 being arranged in the signal path between the amplifier 35 and the summing device 40. The signal AS and the signal AS' from the integrator 37 are combined by means of a summing device 41, and the combined signal is subsequently amplified by an amplifier 42. The output signal of the amplifier 42 constitutes the control signal AS for the actuator 13.

The auxiliary circuit 31 comprises two switchable current sources 45 and 46 arranged in parallel. The terminal 49 of the capacitor 37b is connected to a node 50 common to the parallel arrangement of the current sources 45 and 46 via a series arrangement of electronic switches 47 and 48. In its on-state the current source 45 draws a current of a value J from the node 50, and in its on-state the current source 46 supplies a current of a value J to the node 50. The current sources are controlled by output signals FD and FU of two NAND gates 51 and 52 arranged as a flip-flop (FF1). The input of an amplifier 53 is also connected to the terminal 49 of the capacitor 37b. The output signal of the amplifier 53 is applied to two comparators 54 and 55. The comparator 54 compares the output signal of the amplifier 53 with a positive reference voltage R+ and the comparator 55 compares this output signal with a negative reference voltage R−. The comparator 54 supplies an input signal of a logic 0-level to the NAND gate 51 if the output signal of the amplifier 53 is larger than the reference voltage R+ and the comparator 55 supplies an input signal of a logic 0-level to the NAND gate 52 if the output signal of the amplifier is smaller than the reference voltage R−.

Moreover, a logic control signal FOCUSON is applied to an input of the NAND gate 52. The FOCUSON signal is an external control signal, which indicates that the radiation beam is to be focused onto the recording layer 4.

The circuit 31 further comprises an electronic switch 62 for short-circuiting the capacitor 37b.

The lock-in detection circuit 32 comprises a differential stage 56 for determining the difference between the focus-error signal FE and a negative reference voltage REF. The output signal of the differential stage 56 is applied to a comparator 57, which generates an input signal of a logic 1-level for a NAND gate 58 if the signal value of the focus-error signal FE is smaller than the reference voltage REF.

Moreover, the signal FD from auxiliary circuit 31 is applied to an input of the NAND gate 58. The output signal of the NAND gate 58 is applied to an input of a NAND gate 59, which together with a NAND gate 60 constitutes a flip-flop (FF2). The external signal FOCUSON is applied to the NAND gate 59 as an input signal. The output signal of the NAND gate 60 is inverted by means of a NAND gate 61. The output signal of the NAND gate 60 functions as the detection signal INFOCUS.

The switches 36, 43, 44 and 47 are controlled by the detection signal INFOCUS, the switches 36, 43 and 44 being closed if the signal INFOCUS has a logic 1-level and the switch 47 being closed if the signal INFOCUS has a logic 0-level. The switches 48 and 62 are controlled by the external control signal FOCUSON, the switch 48 being closed if the signal FOCUSON has a logic 1-level and the switch 62 being closed if the signal FOCUSON has a logic 0-level.

The circuit shown in FIG. 3 operates as follows. As long as it not required to focus the scanning beam on the recording layer 4, the start signal FOCUSON has a logic 0-level. This means that the capacitor 37b is short-circuited and the current sources 45 and 46 are not coupled to the capacitor 37b. The output signals of the NAND gates 52 and 60 then have a logic 1-level. The INFOCUS signal is then at a logic 0-level, so that the switches 36, 43 and 44 are open. The circuit is put into operation as soon as the start signal FOCUSON assumes a logic 1-level. As a result of this the switch 62 opens and the switch 48 closes, causing the capacitor 37b to be charged by the current source 46.

As a result of this the control signal AS increases, causing the objective 11 to be moved towards the record carrier. When the capacitor 37b has been charged so far that the output voltage of the amplifier 53 exceeds the reference voltage, the logic level of the output signal FU of the NAND gate 52 becomes 0 and the logic level of the output signal FD of the NAND gate becomes 1, so that the capacitor 37b is discharged by the current source 45 and the objective is moved away from the record carrier 2, i.e. in the direction indicated by the arrow 12 in FIG. 1. As soon as the focus-error signal FE intersects the reference voltage (indicated by the reference numeral 27 in FIG. 2) the signal level of the output signal of the comparator 57 becomes 1. Since during a movement of the objective towards the record carrier the signal level of the signal FD is also 1, the signal level of the output signal of the NAND gate 58 will become 0, so that the output signal of the NAND gate 60 becomes 0. As a result of this the signal level of the detection signal INFOCUS becomes 1.

The current sources 45 and 46 are then no longer coupled to the capacitor 37b because the switch 47 is opened. Moreover the switches 36, 43 and 44 are closed, so that the control loop for focus control is closed, as a result of which the feedback focus-control becomes operative.

In the circuit shown in FIG. 3 the reference voltage REF is selected to be smaller than the smallest value of the focus-error signal FE when the focus P passes the outer surface 28 of the substrate 3. This prevents the focus-control system from locking-in to the outer surface. Moreover, locking-in is possible only if the objective is moving away from the record carrier 2, so that the focus P must first transverse the plane of the recording layer 4 before the outer surface of the substrate 3 is transversed. In this way locking-in of the focus-control system to the outer surface is substantially included.

The circuit shown in FIG. 3 comprises the same capacitor 37b for generating the control signal for the actuator 13 during locking-in and for the integrator of the PID controller after locking-in.

This has the advantage that the number of capacitors is reduced. Another advantage is that at the closing instant the integrator has already been charged to the correct value, so that no undesirable transient effect arises, resulting in a very stable lock-in behaviour. Moreover, since the input signal of the differentiator 34a is already available during the locking-in, closing of the control loop will have no adverse effect on the differentiator.

Figure 4:
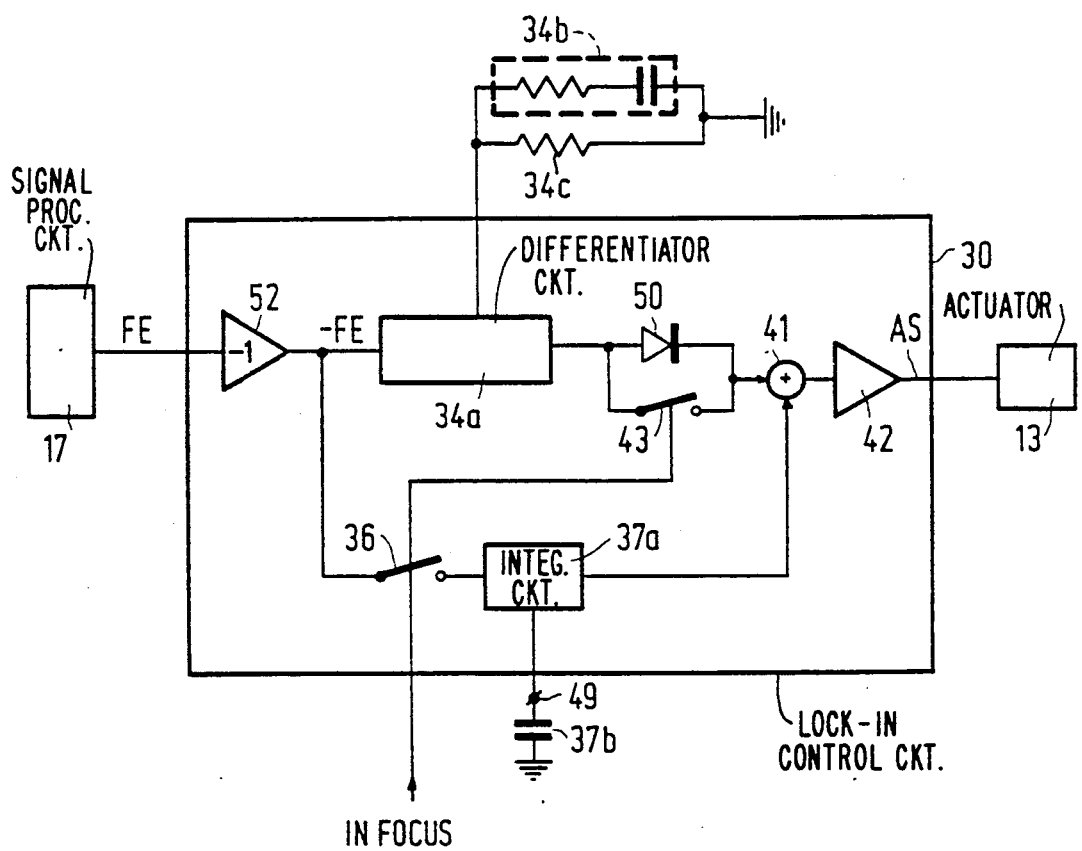
FIG. 4 shows another embodiment of the control circuit for use in the scanning device in accordance with the invention.

FIG. 4 shows another embodiment of the control circuit 30, elements corresponding to those in FIG. 3 bearing the same reference numerals.

In this embodiment the circuits for obtaining the proportional and the differentiating action are combined in one circuit. For this purpose a resistor 34c is arranged in parallel with the RC-circuit 34b. Moreover, a diode 50 is arranged in parallel across the switch 43. If the operating range B is traversed in the direction indicated by the arrow 12 this results in the output signal of the circuit comprising the elements 34a, 34b and 34c being applied to the actuator 13 via the diode 50. Indeed, on account of the steep slope of the FE characteristic in the operating range B, the differentiating term, which then has a positive sign, is predominant over the proportional term.

The transfer of the differentiating term via the diode 50 while the operating range B is traversed has the advantage that the rate at which the operating range B is traversed is limited, so that it is avoided that at the instant at which the focus-control system is turned on when point 27 (in FIG. 2) is reached the speed of the focusing objective 11 is still so high that the operating range B is overshot and the focus-control system consequently fails to lock in.

In FIG. 4 the circuits for performing the proportional and the differentiating action have been combined. However, it will be obvious that the advantageous effect of the diode 50 is also obtained if the proportional action is carried out by a separate circuit.

In the case of a separate circuit for the proportional control action it is also possible during the movement of the focusing objective in the direction indicated by the arrow 12 to apply a signal to the summing circuit 41, which signal has a value corresponding to the absolute value of the output signal of the differentiator 34.

Further, it is to be noted that in the embodiment of the scanning device described herein employs a Foucault detection system for generating the focus-error signal. However, other detection systems may also be used, such as for example an astigmatic focus-error detection system.

Finally, it is to be noted that the invention has been described for controlling the beam focus of apparatus for reading an optical record carrier. However, the invention may also be utilised for controlling beam focus of apparatus for recording information on such a record carrier.

What is claimed is:

1. Apparatus for scanning a recording layer of an optical record carrier by means of a scanning beam, which apparatus includes a focus-control system for focussing the scanning beam on the plane of the recording layer to produce reflected radiation therefrom; said focus-control system comprising:
   an actuator for moving the beam focus relative to the plane of the recording layer;
   focus-error detecting means for deriving from the reflected radiation a focus-error signal (FE) which, within a specific operating range of the actuator, is indicative of the displacement between the beam focus and the plane of the record carrier;
   a focus control circuit for deriving from the focus-error signal (FE) a first control signal (AS") for controlling the actuator, the signal (AS") having at least a component which is substantially proportional to the focus-error signal (FE);
   signal generating circuit means for producing a second control signal (AS') for the actuator, said signal generating circuit means comprising an auxiliary circuit for generating a time-variable auxiliary signal and an integrating circuit for integrating the auxiliary signal to derive said second control signal (AS') therefrom;
   a lock-in control circuit for deriving from the focus-error signal (FE) or from the reflected radiation a lock-in signal (INFOCUS) which indicates when the focus actuator is within its operating range, and supplying said lock-in signal to said signal generating circuit and to said focus control circuit;
   said lock-in signal causing said focus control circuit to supply said first control signal (AS") to said actuator and also causing said signal generating circuit means to supply said focus-error signal (FE) to said integrating circuit in place of said second control signal (AS'), whereby said integrating circuit supplies the integral of said focus-error signal (FE) to said actuator in place of said additional control signal (AS') when the actuator is within its operating range.

2. A scanning device as claimed in claim 1, wherein the output of said integrating circuit is coupled to an input of said auxiliary circuit so as to form a feedback oscillator for producing said second control signal (AS').

3. A scanning device as claimed in claim 1, characterized in that said integrating circuit comprises a capacitor.

4. A scanning device as claimed in claim 1, characterized in that the lock-in control circuit derives the lock-in signal (INFOCUS) from the focus-error signal (FE).

5. A scanning device as claimed in claim 4, characterized in that said auxiliary circuit comprises means for further generating a direction signal indicative of the direction of movement of the beam focus by said actuator and for supplying said direction signal to said lock-in control circuit; said lock-in control circuit being adapted to derive the lock-in signal (INFOCUS) from said focus-error signal (FE) and said direction signal in such a manner that the lock-in signal is not generated until the focus-error signal (FE) reaches a specific reference level during a predetermined direction of movement of the beam focus by said actuator.

6. A scanning device as claimed in claim 5, characterized in that said focus control circuit comprises:
   a differentiating circuit for producing the time-derivative of the focus-error signal (FE), the focus control circuit being adapted to derive said first control signal (AS") from the time-derivative of the focus-error signal (FE); and switching means responsive to said lock-in signal (INFOCUS) to supply said first control signal (AS") to said actuator.

7. A scanning device as claimed in claim 6, characterized in that said focus control circuit further comprises means for applying the time-derivative of the focus-error signal (FE) to said actuator when the actuator traverses its operating range in said predetermined direction while said INFOCUS signal is not being generated by said lock-in control circuit.

8. A scanning device as claimed in claim 7, characterized in that the time-derivative of the focus-error signal (FE) is supplied to said actuator by a rectifying element.

9. A scanning device as claimed in claim 1, characterized in that the focus control circuit and the signal generating circuit means, with the exception of a capacitor comprised in said integrating circuit, are comprised in a single integrated circuit.

* * * * *